United States Patent [19]

Nilsson

[11] Patent Number: 4,803,024
[45] Date of Patent: Feb. 7, 1989

[54] METHOD OF PRODUCING A CONTAINER

[75] Inventor: Torsten C. Nilsson, Löddeköpinge, Sweden

[73] Assignee: Petainer S.A., Neuchatel, Switzerland

[21] Appl. No.: 847,902

[22] PCT Filed: Jun. 17, 1985

[86] PCT No.: PCT/SE85/00253
§ 371 Date: Mar. 5, 1986
§ 102(e) Date: Mar. 5, 1986

[87] PCT Pub. No.: WO86/00565
PCT Pub. Date: Jan. 30, 1986

[30] Foreign Application Priority Data

Jul. 5, 1984 [SE] Sweden ................... 8403569

[51] Int. Cl.⁴ ............. B29C 35/02; B29C 49/22; B29C 55/26
[52] U.S. Cl. ..................... 264/80; 264/134; 264/292; 264/296; 264/322; 264/512; 264/516; 264/521; 264/532
[58] Field of Search ............. 264/292, 294, 296, 322, 264/532, 80, 134, 516, 512, 521; 425/392, 393

[56] References Cited

U.S. PATENT DOCUMENTS

| 2,249,775 | 7/1941 | Millspaugh | 264/323 |
| 3,205,290 | 9/1965 | Covington, Jr. et al. | 264/292 |
| 3,651,202 | 3/1972 | Raabe | 264/292 |
| 3,757,718 | 9/1973 | Johnson | 264/292 |
| 3,929,959 | 12/1975 | Findlay et al. | 264/322 |
| 4,261,948 | 4/1981 | Krishnakumar et al. | 264/532 |

FOREIGN PATENT DOCUMENTS 2076731 12/1981 United Kingdom .

Primary Examiner—Jan H. Silbaugh
Assistant Examiner—Neil M. McCarthy
Attorney, Agent, or Firm—Roberts, Spiecens & Cohen

[57] ABSTRACT

A method of producing a container of plastic material capable of being oriented and/or crystallized, in which a substantially tubular blank is, in at least two mutually consecutive and mutually separate shaping phases or shaping stages, reshaped into the container. The blank is reshaped into the container by mechanical forming elements (34,42) which stretch the material in the axial direction of the blank, and in the circumferential direction of the blank. By stretching the material in each separate shaping stage to a regulated degree, there will be accumulated in the material a total stretching corresponding to the requisite stretching in order to impart to the material the desired and predetermined orientation and thereby the requisite strength properties.

15 Claims, 3 Drawing Sheets

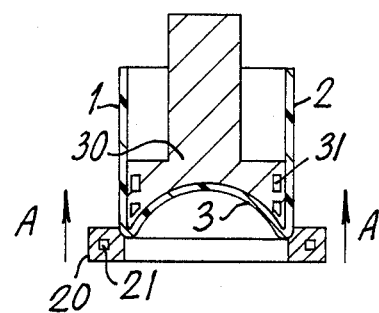
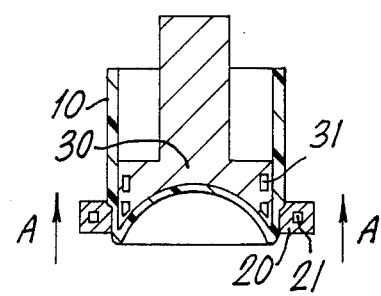
FIG. 1  FIG. 2
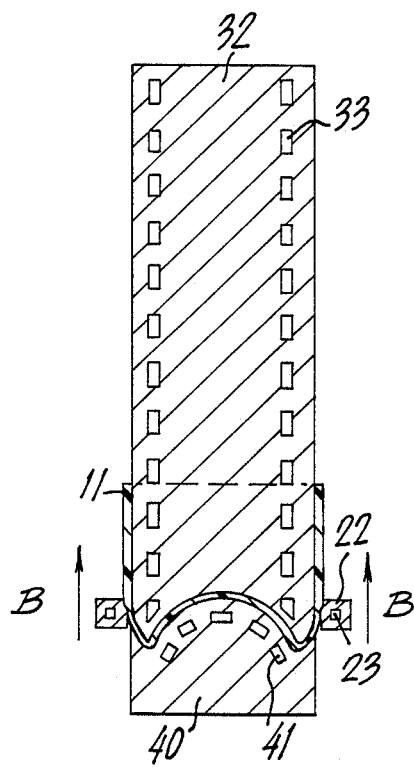
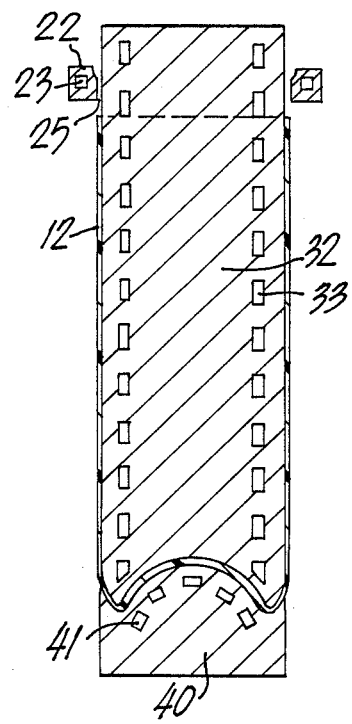
FIG. 3  FIG. 4

METHOD OF PRODUCING A CONTAINER

FIELD OF THE INVENTION

The present invention relates to a method of producing a container from a tubular blank of plastic material capable of being oriented and/or crystallized, in at least two consecutive shaping stages, utilizing mechanical forming elements for stretching the material in the axial direction of the blank and in the circumferential direction of the blank.

PRIOR ART

It is previously known in this art to reshape blanks, which include axially oriented material, into containers. In such a process, the reshaping is effected by means of a blowing process in which the blank is brought into abutment against forming walls whose form (configuration) corresponds to the form of the container which is to be produced. Patent Specification No. GB 2 076 731 describes a technique for the production of a bottle-like container from a blank which includes axially oriented material.

Patent Specification No. GB 2 052 364 discloses a technique in which an axially stretched blank is, by one or more mechanical reshaping stages, reshaped into a container. According to the technique shown in this Patent Specification, a reduction only of the circumference of the container body takes place on reshaping of the blank into the container.

Patent Specification No. GB 2 052 363 describes a technique in which a blank of axially oriented material is reshaped, by a blowing process, into a container. Also according to this patent specification, an axially oriented blank is reshaped into a container.

There are pressing needs within this Art for a container of plastic material which is suitable for high-temperature applications and/or for the storage of liquids under pressure, e.g. the storage of carbonated soft drinks, beer etc. The term high-temperature application is here taken to mean that the containers are used, for example, for pasteurization (at 60°–65° C.) of the contents in the filled and sealed container, for hot-filling, by which is taken to mean that boiling liquid is filled directly into the containers, or for sterilization (at least 121° C.) of the contents of the filled and sealed containers.

Further desires relating to containers of plastic material are that it must be possible to produce containers whose body is of a cross section which is independent of the mouth portion of the container, e.g. the body has a polygonal cross section, while the mouth portion of the container is circular. The circular configuration of the mouth portion of the container is desirable so as to facilitate closure of the container.

So as to reduce unit costs for the containers, it is further necessary that the material distribution in the containers be adapted to meet calculated mechanical stresses in the different parts of the container (mouth portion, container body and bottom). Furthermore, it is also necessary that the material distribution in each region (portion) of the individual container be as uniform as possible, since the thinnest—and thereby the weakest—part in each such region is determinative of those stresses which the container can withstand. Apart from the material distribution, the mechanical strength of the containers is, naturally, also determined by the orientation and/or thermal crystallization of the material.

A further requirement placed on containers of the type contemplated herein, and particularly on containers intended for high-temperature applications, is that the shrinkage which occurs on heating of stretched and oriented material must be eliminated or reduced to acceptable levels.

In the storage of liquids under pressure, it is a matter of the Laws of Physics that when there is inner pressure within the container, its wall material is subjected to a stress which is approximately twice as great in the circumferential direction as in the axial direction. In order to improve the strength of the plastic material, it is known in the art to shape the container by a blowing process, the temperature of the material being adapted to suit the properties of the material being employed in order, during the blowing process, to stretch the material and thereby orientate it.

The blow molding technology suffers from the drawback that the material distribution on shaping of the container is not fully under control, since, on expansion of the blank into the form of the container, it is not possible to exactly determine and control where and how the stretching and thereby the orientation of the material take place. Normally, the stretching commences at a number of starting points whose positions are determined by the prevailing temperature distribution in the material and the stretching forces arising therein. The extent of the expansion and the thus obtained stretch relationship is, moreover, temperature-dependent, which, together with the heating of the material which takes place when the material crystallizes in consequence of the stretching, results in that the formed container has a material thickness which varies, i.e. in one section at right angles to the axial direction the thickness of the container wall varies in the circumferential direction. Corresponding variations also occur in the axial direction of the container, i.e. in axial sections through regions of substantially the same circumference there are alternatingly thinner and thicker material portions. Thus the prior art techniques call for a selection of the wall thickness of the blank with reference to the above-described uncertainty in the stretching and thinning of the material, which entails an overdimensioning of the blank and, thereby, also a material surplus in the formed container.

In order to realize temperature stability in containers of thermoplastic material capable of being oriented and/or crystallized, it is known in the art to render the containers thermally stable by causing, during blowing of the containers, the container material to meet hot molding walls, against which the material abuts for a relatively long period of time (of the order of magnitude of 1–2 minutes). This is attained in that an inner pressure is maintained within the blown container and urges the wall material against the molding walls. However, the long cycle times involved render this technique extremely costly.

SUMMARY OF THE INVENTION

The present invention relates to a technique in which the above-outlined drawbacks are obviated. According to the present invention, the starting point is a blank of material capable of being oriented and/or crystallized. From the blank is produced a container of high mechanical strength and thermal stability, and with improved material distribution as compared with prior art techniques. According to the present invention, the time consumed for the production of each individual container is reduced in comparison with the time consumed in prior art techniques, the present invention also entailing a simplified structure.

Thus, employment of the present invention will bring about a reduction of the requisite material requirement in each container, an attainment of desired thermal stability and a reduction of costs as compared with prior art techniques currently in use.

According to the present invention, a blank of a thermoplastic material which has the property of being able to be oriented by a mechanical processing and/or to be thermocrystallized by a heat treatment, is reshaped into a container in a number of consecutive reshaping stages which, in one preferred embodiment, take place in mutually separate substages. In each such phase or stage, the material is stretched either in the axial direction or in the circumferential direction of the future container. By stretching the material each time to a regulated and controlled extent, there will be accumulated in the material a total stretching which corresponds to the stretching required to impart to the material the desired and predetermined orientation, and thereby the requisite strength properties.

In one preferred embodiment of the present invention, the blank is reshaped, in all substages, into the container by the use of mechanical forming elements. The mechanical stretching is effected in each stage with the material at a determined and regulated temperature which may be selected within a broad range, the temperature selection being, however, determined by the special effect it is desired to attain in the currently topical shaping stage under consideration. For materials with a distinct glass transition temperature, hereafter abbreviated as TG, for example the temperature of the material at certain—and as a rule at the initial—shaping stages is lower than TG, while at the final shaping stage or stages, the temperature as a rule exceeds TG. For the material polyethylene terephthalate, hereafter abbreviated to PET, the temperature, in one preferred embodiment of the present invention, is selected in the range of between 70° and 160° C. for the final shaping stages, while the initial shaping stages generally take place at a lower temperature.

In certain embodiments of the present invention, the container is given its final form in a concluding blow molding stage. In this stage, only a minor change of shape will take place in the form of an expansion in the circumferential direction, e.g. of the container body, so as to produce the desired cross section (e.g. polygonal), while retaining the circular configuration and diameter of the mouth portion.

In a first application of the present invention, the point of departure is a cylindrical blank of material with the properties stated above, e.g. a thermoplastic material such as PET. The blank has a bottom portion of a shape which substantially corresponds in its central bottom part to the shape of the central bottom part of the container which is under production. In a first shaping stage, the material is stretched by means of a draw ring which surrounds the blank and cooperates with an internal mandrel, in the axial direction of the blank. The dimensions of the mandrel and the surrounding draw ring are selected such that there is formed, between the mandrel and the draw ring, a gap, whose width is less than the thickness of the material of the blank. The stretching is effected in that relative displacement takes place between the draw ring and mandrel, with the result that the material in the blank wall is forced to pass through the gap, whereby the material thickness in that portion of the blank wall which passes through the gap is reduced, with simultaneous axial stretching of the blank. As a rule, the thickness reduction corresponds to that reduction imparted to the material on free stretching, which corresponds to material flow at the temperature employed. In this stage, a first preform is created which, in conjunction with its central bottom part, has a region with axially stretched material. In, for example, Patent Specification No. GB 2 092 943, is described a technique for stretching and orienting of plastic material by causing the material to pass through a gap.

In the next stage, the circumference of the body of the first preform is widened, this body essentially corresponding to the cylindrical portion of the first preform, in that a mandrel is urged into the first preform, the material in the first preform undergoing a certain stretching in the circumferential direction during simultaneous reduction of the material thickness. Here, there will be formed a second preform. Those parts of the mandrel which widen the first preform most proximal its central bottom part have, in an axial section, a profile length substantially corresponding to the length of the axially stretched material according to the preceding paragraph. The transition between the axially stretched material and the non-axially stretched material constitutes, in the widened first preform—i.e. in the second preform—the defining line of the cylindrical portion of the second preform most proximal the bottom portion.

The material of the cylindrical portion of the second preform is thereafter stretched in an axial direction (with the application of a technique corresponding to that described above) by means of a draw ring which, in cooperation with an internal mandrel, forms a gap. Here, the internal mandrel is preferably the same mandrel which realized the widening of the first preform as described in the preceding paragraph. On stretching, the material thickness is reduced during simultaneous axial elongation of the second preform. As a rule, the thickness reduction which the material undergoes corresponds to the reduction imparted to the material on free stretching corresponding to material flow at the temperature employed. Here, there will be created an intermediate preform whose bottom portion substantially has its counterpart in the material in the bottom portion of the blank and which otherwise consists of high-grade axially stretched material which, this apart, has a certain if albeit lesser stretching in the circumferential direction of the intermediate preform.

By means of a mandrel which is urged into the intermediate preform, this preform is further widened for further stretching of the material in the circumferential direction, so as to attain the material orientation which provides the requisite strength properties. The reshaping described in this passage is generally effected with the mandrel at a raised temperature for shrinking in the axial direction of the blank of the stretched material during simultaneous thermocrystallization of the material. The term shrinking is here taken to mean the length reduction which the stretched material undergoes as a result of the heating. In this shaping stage, the intermediate preform is reshaped into a final preform. In certain applications, the final preform also constitutes the contemplated finished product, i.e. constitutes the container proper, while in other applications, the mouth portion of the final preform is reshaped in adaptation to serve its intended purpose, e.g. by means of mechanical devices it is given a "neck-in" which is required in order that a cap, e.g. fixedly-folded with the mouth flange shall not protrude beyond the container body. In those examples where the body of the final preform has a polygonal cross section, the mouth portion is, as a rule, reshaped so as to realize a circular opening.

The nature of the present invention and its aspects will be more readily understood from the following brief description of the accompanying drawings, and discussion relating thereto.

BRIEF DESCRIPTION OF THE DRAWINGS

In the accompanying drawings:

FIG. 1 is an axial section through a blank placed in an apparatus for axial orienting of material;

FIG. 2 is an axial section through a preform formed by the blank of FIG. 1;

FIG. 3 is an axial section through a widened preform, together with apparatuses for the widening of the preform and axial stretching of the material in the preform;

FIG. 4 shows the intermediate preform obtained on the stretching according to FIG. 3;

DETAILED DESCRIPTION OF PREFERRED EMBODIMENTS

Figure 5:
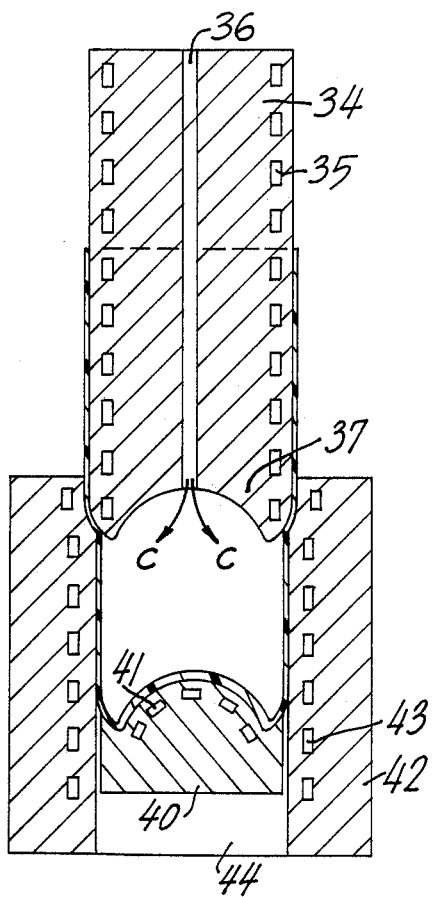
FIG. 5 is an axial section through the intermediate preform, together with apparatuses for the reshaping of the intermediate preform into a final preform.

Referring to the Drawings, FIG. 1 shows a blank 1 with a tubular blank body 2 and a closed bottom 3. The blank consists of plastic material capable of being oriented and/or crystallized and is, for example, produced by injection molding or thermoforming. Within the blank, there is a mandrel 30 which is disposed for cooperation with a draw ring 20 provided outside the blank. In the mandrel and the draw ring, respectively there are channels 31 and 21, respectively, for a temperature-regulating liquid.

The mandrel 30 and the draw ring 20 are disposed for axial movement in relation to one another, there being formed a circumferential gap or space between the mandrel and the draw ring. The width of the gap is adapted to the thickness of the material wall in the blank body 2, in order, on movement of the draw ring in the direction of the arrows A in relation to the mandrel 30, to reduce the material thickness of the blank body in a transitional zone between thinner and thicker material, during simultaneous stretching and orienting of the material when the transitional zone is moved towards the mouth portion of the blank.

FIG. 2 shows one embodiment in which the material is stretched only in a limited region in conjunction with the bottom portion of the blank, there being formed a first preform 10 as shown in FIG. 2.

FIGS. 3 and 4 illustrate a mandrel 32 provided with temperature-regulating channels 33. The mandrel is of greater circumference than the circumference of the previously-mentioned mandrel 30, and, moreover, the mandrel 32 has, in the transition to its bottom portion, a part curved inwardly towards the center, whose length in the axial direction of the mandrel corresponds to the length of the axially stretched material portion of the first preform 10. A mold bottom 40, also provided with temperature-regulating channels 41, is to be found at the bottom in the Figure. The mold bottom 40 is of a configuration which corresponds to the form of the bottom 3. The Figure also shows a draw ring 22 with temperature-regulating channels 23. The draw ring 22 is dimensioned so as to form, between itself and the mandrel 32, a gap which is moved in a direction towards the mouth portion of a widened preform 11 on movement in the direction of the arrows B in relation to the mandrel 32. On insertion of the mandrel 32 into the first preform 10 the widened preform (second preform) is formed and on subsequent movement of the gap, the material of the body of the widened preform is stretched and oriented in accordance with that disclosed in conjunction with FIG. 2, during simultaneous axial elongation of the preform for forming an intermediate preform 12 (FIG. 4). In FIG. 4, the draw ring 22 is shown in a position where all material in the blank body 2 has undergone axial stretching and orienting. The gap 25 formed between the mandrel and the draw ring is also apparent in this Figure.

Thus, the function of the mandrel 32 is first to cooperate with the mold bottom 40 on the expansion of the widened preform into the intermediate preform 12, and secondly to cooperate with the draw ring 22 so as to form the gap 25 through which the material of the container body has passed so as to attain the desired axial stretching of the material.

Figure 6:
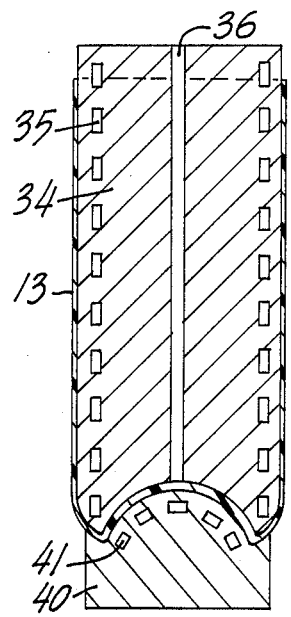
FIG. 6 is an axial section through the reshaped intermediate preform.
Figure 7:
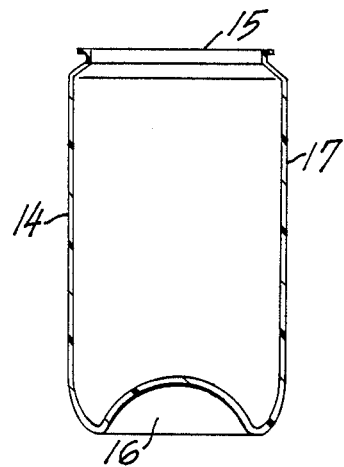
FIG. 7 is an axial section through a container.

FIGS. 5 and 6 show elements for reshaping the intermediate preform 12 into the final preform 13. The Figures show a mandrel 34 provided with channels 35 for temperature-regulating liquid, and with one channel 36 for a pressure medium. The channel 36 for the pressure medium discharges in the bottom portion 37 of the mandrel, where the mandrel is of a configuration which is adapted in conformity with the configuration of the bottom 3 of the blank.

FIG. 5 also shows an outer support member 42 which surrounds the intermediate preform 12 during its reshaping and which has a central cavity 44 through which the intermediate preform 12 and the mold bottom 40—now operating as a press plunger—pass. In the upper region of the support member (with the orientation as shown in FIG. 5), the central cavity flares so as to form, between the inner defining surface of the outer support member and the outer defining surface of the mandrel 34, a gap or space through which the wall of the intermediate preform passes on its reshaping into the final preform 13. For purposes of clarity, the outer support member 42 has been omitted from FIG. 6. In certain applications, the liquid temperature-regulating channels 43 are used for regulating the temperature of the outer support member 42.

On reshaping of the intermediate preform 12 to the final preform 13, the intermediate preform is placed within the central cavity 44 of the outer support member and is pressed by the mold bottom 40 in a direction towards the mandrel 34. Since the mandrel 34 is of a greater circumference than the inner circumference of the intermediate preform 12, the mouth edge of the intermediate preform is urged into abutment against the outer surface of the mandrel 34 and is moved, on continued upward movement of the mold bottom 40, outwardly and upwardly in the Figure, with simultaneous stretching of the material in the circumferential direction of the intermediate preform. The abutment of the plastic material of the preform against surfaces of the mold bottom 40, the outer support member 42 and of the mandrel 34 regulates the temperature of the plastic material before, during and after the reshaping of the intermediate preform into the final preform. To stabilize the intermediate preform mechanically, a pressure medium is applied through the channel 36 to the interior of the intermediate preform. During the upwardly-directed movement of the intermediate preform, pressure medium passes between the inner wall of the intermediate preform and the mandrel 34, and thereby reduces the friction between the plastic material and the inner defining surface of the outer support member 42. Once movement is completed, the mold bottom 40 assumes the position illustrated in FIG. 6, in which the intermediate preform is reshaped into the final preform 13. In certain embodiments of the present invention, the inner pressure will ensure that the material is brought into abutment against the outer support member at least in those regions where reshaping is about to take place.

In certain applications, a reduction of the circumference of the mouth portion then takes place, there being also formed a flared flange intended to be folded together with a cap or seal once the container has been filled with its final contents.

In certain applications, the mandrel 32 is also provided with a counterpart to the pressure medium channel 36, for cooperation with outer members corresponding to that described in conjunction with FIGS. 5 and 6.

FIGS. 8-11 show an alternative embodiment of the present invention. The figures illustrate axial sections of the blank 1a during its reshaping into the container, while, on the other hand, only some of the devices, (mandrel, mold bottom, support member, etc.) which are required in conjunction with the reshaping, are shown. However, these devices, correspond fundamentally to those already described and it will be obvious to the skilled reader of this specification that the previously-described devices are, after certain adaptation, also suitable for use in this embodiment of the invention.

Figure 8:
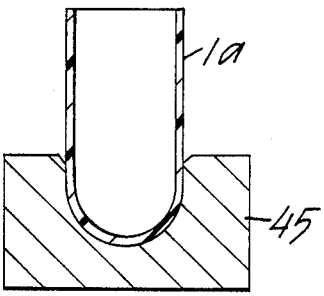
FIG. 8 is an axial section through a blank of other configuration than the blank of FIG. 1.
Figure 9:
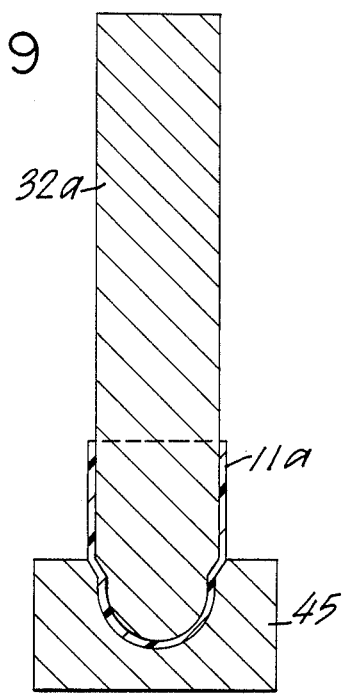
FIG. 9 is an axial section through the blank of FIG. 8, widened into a preform.
Figure 10:
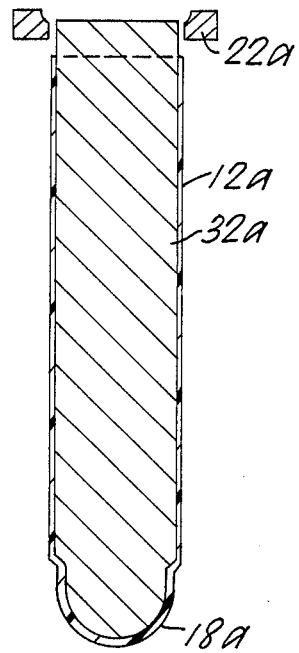
FIG. 10 is an axial section through the blank stretched to an intermediate preform.
Figure 11:
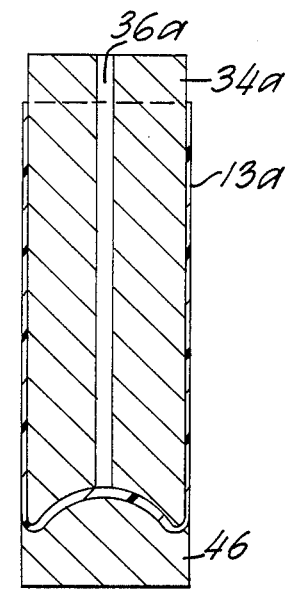
FIG. 11 is an axial section through a final preform obtained by reshaping of the intermediate preform of FIG. 10.

The blank 1a shown in FIG. 8 is reshaped to the widened preform 11a in that a mandrel 32a corresponding to the previously described mandrel 32 is urged down into the blank which is simultaneously supported by a cup-like mold bottom 45. By means of draw rings 22a, the material is thereafter stretched in the axial direction of the blank, an intermediate preform 12a being formed. This is thereafter widened in its circumferential direction by means of a technique corresponding to that described in conjunction with FIGS. 5 and 6, to reshape the intermediate preform 12a into the final preform 13a. By means of thermoforming between a die 46 and the mandrel 34a, the bottom portion 18a of the intermediate preform is reshaped to a form corresponding to the form of the central bottom part of the bottom portion 16 of the container. Reshaping of the final preform 13a into the container 14 takes place in complete agreement and correspondence with the previous description and generally in the stage when the intermediate preform is reshaped to the final preform.

It will be clearly apparent from the body of this description that, in certain applications, the shaping, as illustrated in FIG. 2, of the first preform 10 is not used, but that the blank 1 has a circumference which is adapted to orienting the material as described in the discussion in conjunction with FIG. 3.

All drive means which realize the movements of the mechanical elements have been omitted from the Drawings. It is obvious to the skilled reader of this specification that these may be arranged and provided according to prior art techniques, e.g. such as mechanical, hydraulic or pneumatic drive means.

The temperature of the material is set and adjusted as required and intended for in each shaping and processing stage by means of the temperature-regulating liquid channels 21,23,31,33,35,41,43 of the mechanical elements. It will also be apparent from this description that separate parts of the shaping apparatus are, if necessary, adjustable to different temperatures at each individual processing occasion or stage.

As has already been mentioned, the blank is expanded in its circumferential direction, for stretching of the material in the wall of the blank. For materials with a distinct TG, at least the axial, and also the final stretchings, are generally effected at a temperature in excess of TG. For, for example, PET, stretching generally takes place in the temperature range of between 70° and 130° C. In certain embodiments, the expansion in the circumferential direction is effected in one single reshaping stage, whereas, in other embodiments, in which a greater degree of stretching is contemplated, the expansion takes place in several consecutive reshaping stages. It generally applies that at least the final shaping stage takes place, as a rule, at a raised temperature in order to thermocrystallize the plastic material.

By means of the mechanical reshaping process the stretching and distribution of the material is exactly controlled both in the axial and circumferential direction of the blank or preform and also exactly controlled in each forming step. The final product will thus in each region (portion) possess a thickness, an orientation and/or a crystallization adapted to the expected stresses in each specific region of the product. In contrary to a prior Art container, a container made according to the method now presented has, as an example, circumferential material sections at right angles to the axial direction of the container, the sections consisting of material of uniform thickness, orientation and/or crystallization. The term crystallization is related to the crystallization produced by stretching and/or by heating the plastic material.

In certain embodiments of the present invention, an outer coating is applied onto the material, for example a barrier material preventing the passage of light, radiation and/or gas, decorative artwork, etc., in conjunction with that stage in which the intermediate preform is reshaped into the final preform. In this instance, at least the surface material of the intermediate preform is rapidly heated, for example by a so-called flame treatment, whereafter the outer surface of the intermediate preform is provided with the desired coating, e.g. by immersion dipping, by spraying, by roller coating, etc. The thus treated intermediate preform is subsequently pre-dried, e.g. when PET is used, preferably at a temperature in the range of between 50° and 60° C., whereafter the thus treated intermediate preform undergoes the above-described mechanical reshaping into the final preform. The mechanical reshaping into the preform is preceded, in certain applications, by a temperature conditioning of the material of the intermediate preform. However, as a rule, such temperature conditioning is concentrated at the bottom portion of the intermediate preform, in order, in those applications in which the bottom portion of the intermediate preform is reshaped on forming of the final preform, to facilitate reshaping of the bottom portion.

A considerable advantage inherent in the above-described technique is that mechanical elements control and determine, on forming of the container, the stretching and the thickness reduction of the material in each individual material portion and at each individual shaping stage. The employment of an internal mandrel against which the material abuts also ensures a reliable and rapid thermal adjustment of the material to the temperature determined for each individual shaping stage. In particular in the final shaping stages, the abutment against the internal mandrel makes for an extremely short material temperature adjustment time, e.g. for shrinking and/or thermal crystallization of the material, since the wall thickness in the final shaping stages is reduced. By combining this inner temperature regulation with a temperature regulation acting against the outer surface of the material, e.g. heating or cooling, the temperature adjustment time will be further reduced.

The above-described flame treatment of the material imparts to the surface layer an excellent adhesion capability of the applied layer. Any possible subsequent pre-drying in combination with possible temperature conditioning of the intermediate preform prior to its reshaping into the final preform, and the above-described shrinking together with thermal crystallization of the final preform all make for a reliable adhesion of the applied layer.

The above detailed description relates only to a limited number of embodiments of the present invention, but the skilled reader of this specification will readily perceive that the invention accomodates a great number of modifications in the disclosed embodiments, without departing from the spirit and scope of the appended Claims.

I claim:

1. A method of producing a container from a tubular blank having a closed bottom at one end and an open mouth at the other end, the blank consisting of plastic material capable of being deformed, said method comprising:

axially stretching a limited region of the wall of the tublular blank near said closed bottom end, then circumferentially stretching a portion of the wall of the tubular blank which extends from the open mouth thereof while keeping the closed bottom and an adjacent portion of the wall unstretched, then axially stretching said blank to produce axial orientation in the wall of said blank, then supporting the tubular blank in an outer support member with the closed bottom of the tubular blank resting on a mold bottom member, positioning a mandrel at the open mouth of the tubular blank, the mandrel having an outer diameter which is greater than the inner diameter of the tubular blank, and producing relative movement between the mold bottom member, on the one hand, and the outer support member and mandrel, on the other hand, to force the tubular blank to expand on the mandrel and pass through a gap formed between the mandrel and the outer support member whereby to circumferentially expand the tubular blank to form the container.

2. A method as claimed in claim 1 comprising heating the material such that the material is at the temperature of crystallization when the material passes through said gap.

3. A method as claimed in claim 2 wherein the expanded material of the tubular blank which forms the wall of the container travels on the mandrel as the blank is expanded, said method further comprises heating the wall of the container from the mandrel as the wall travels on the mandrel.

4. A method as claimed in claim 1 comprising heating the closed bottom of the tubular blank by said mold bottom member during the circumferential expansion.

5. A method as claimed in claim 1 comprising pressurizing the interior of the hollow tubular blank during circumferential expansion thereof to reduce friction of the material of the surfaces of the outer support member and the mandrel.

6. A method as claimed in claim 5 wherein the pressurizing of the interior of the hollow, tubular blank is effected by conveying a pressure medium through a channel in the mandrel to said interior.

7. A method as claimed in claim 5 comprising heating said outer member and contacting the wall at the tubular blank with the heated outer member prior to circumferential expansion thereof.

8. A method as claimed in claim 7 wherein the outer member is heated to the temperature of crystallization of the plastic material.

9. A method as claimed in claim 2 wherein the expanded material of the tubular blank which forms the wall of the container travels on the mandrel as the blank is expanded, said method further comprises heating the wall of the container while on said mandrel.

10. A method as claimed in claim 9 wherein said heating of the wall of the container is a flame treatment.

11. A method as claimed in claim 1 wherein said axial orientation corresponds to that obtained by stretching of the material to produce material flow.

12. A method as claimed in claim 11 wherein said axial stretching is produced by axially relatively moving a draw ring surrounding said tubular blank and a forming body inserted into said blank.

13. A method as claimed in claim 1 wherein said axial stretching is effected only on the circumferentially stetched portion.

14. A method as claimed in claim 1 comprising applying a barrier coating onto the axially stretching tubular blank before the blank is circumferentially expanded to form the container.

15. A method as claimed in claim 14 comprising heating the thus coated blank before the blank is circumferentially expanded to form the container.

* * * * *